United States Patent
Everson et al.

(10) Patent No.: US 8,220,680 B1
(45) Date of Patent: Jul. 17, 2012

(54) DISPLAY PACKAGE CONVERTIBLE TO MOBILE DEVICE HOLDER

(75) Inventors: John M. Everson, Leawood, KS (US); Michael A. Gailloux, Overland Park, KS (US); Michael W. Kanemoto, Lakewood, CO (US); Daniel Mota Veiga, San Clemente, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1057 days.

(21) Appl. No.: 12/145,462

(22) Filed: Jun. 24, 2008

(51) Int. Cl.
*B60R 7/06* (2006.01)

(52) U.S. Cl. ........ 224/486; 224/544; 224/929; 206/320; 206/736

(58) Field of Classification Search .................. 224/484, 224/486, 544, 929; 206/320, 736
See application file for complete search history.

(56) References Cited

U.S. PATENT DOCUMENTS

| | | | | |
|---|---|---|---|---|
| 4,349,102 A | * | 9/1982 | Strongwater | 206/45.24 |
| 5,414,770 A | * | 5/1995 | Wang | 379/446 |
| 5,595,300 A | * | 1/1997 | Paik et al. | 206/449 |
| 5,839,919 A | * | 11/1998 | Chen | 439/529 |
| 5,971,242 A | * | 10/1999 | Schuerman | 224/544 |
| 6,478,276 B1 | * | 11/2002 | Louh | 248/309.1 |
| D469,348 S | * | 1/2003 | Demus et al. | D9/415 |
| 6,814,238 B2 | * | 11/2004 | Lee | 206/722 |
| 7,000,774 B2 | * | 2/2006 | Bryant | 206/769 |
| D593,405 S | * | 6/2009 | Ma et al. | D9/415 |
| 7,635,112 B2 | * | 12/2009 | Lin | 248/276.1 |
| 2006/0144753 A1 | * | 7/2006 | Tsai | 206/766 |

* cited by examiner

*Primary Examiner* — Justin Larson

(57) ABSTRACT

A display package convertible to a mobile device holder is provided. The display package includes a display package first part, a display package second part, a retaining member, and a connecting member. The display package first part and the display package second part are connected to each other and foldable onto each other between a flipped-open state and a flipped-closed state. The retaining member releasably retains a mobile device, wherein the retaining member is shaped to engage the mobile device so as to restrain the mobile device in at least one of up, down, right, left and forward directions when the display package is in at least one of the flipped-open state and the flipped-closed state. The connecting member connects the display package to a vehicle interior.

17 Claims, 11 Drawing Sheets

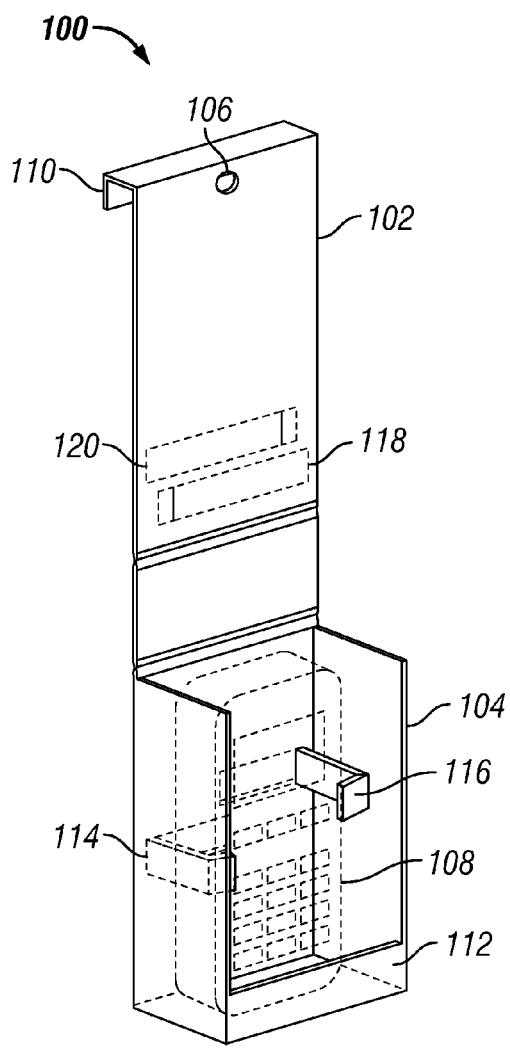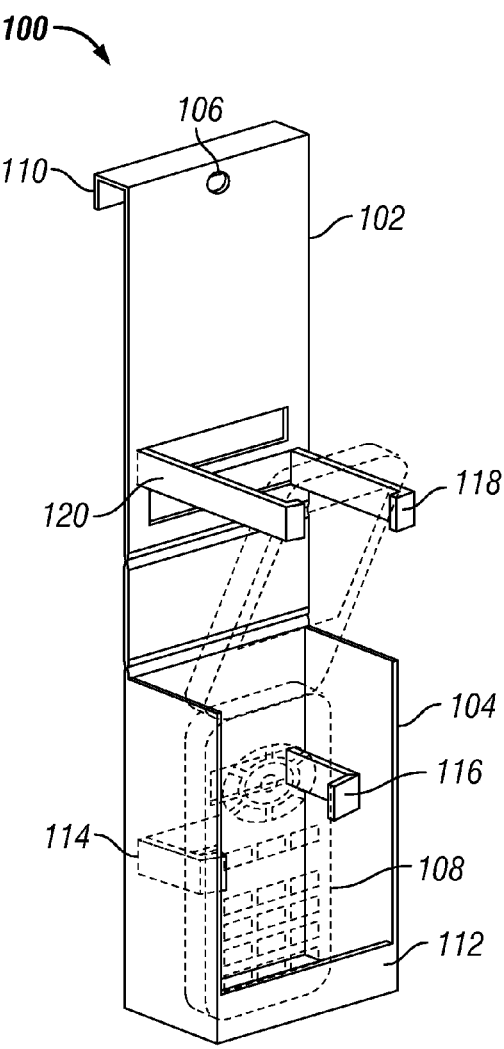
*FIG. 3A*  *FIG. 3B*

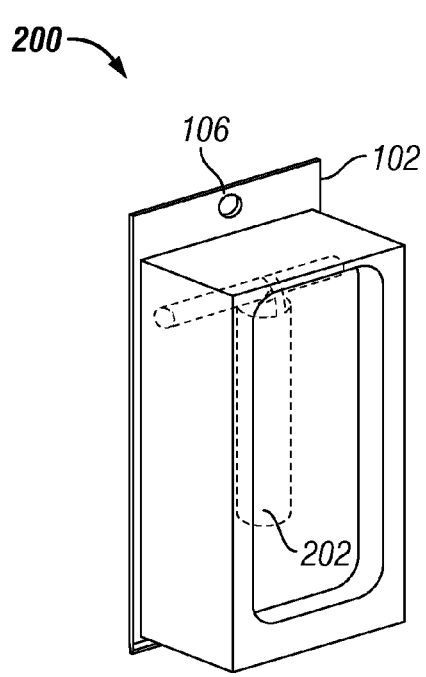
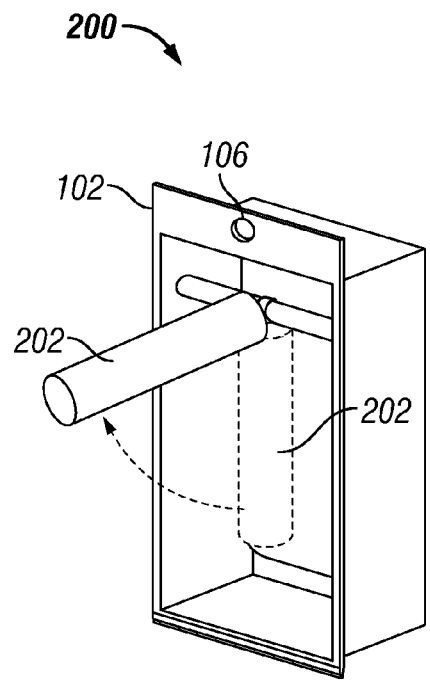
FIG. 5C  FIG. 6A
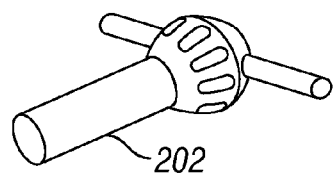
FIG. 6B

DISPLAY PACKAGE CONVERTIBLE TO MOBILE DEVICE HOLDER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of mobile devices, such as mobile phones, may use mobile device holders to take their mobile devices with them wherever they go. Mobile device holders may be designed to attach mobile devices to a user's clothing, body, or vehicle, for example. Mobile device holders, in some cases, are sold as accessories by the mobile device manufacturer and/or by after-market suppliers.

SUMMARY

Accordingly, a display package convertible to a mobile device holder is provided. The display package includes a display package first part, a display package second part, a retaining member, and a connecting member. The display package first part and the display package second part are connected to each other and foldable onto each other between a flipped-open state and a flipped-closed state. The retaining member releasably retains a mobile device, wherein the retaining member is shaped to engage the mobile device so as to restrain the mobile device in at least one of up, down, right, left and forward directions when the display package is in at least one of the flipped-open state and the flipped-closed state. The connecting member connects the display package to a vehicle interior.

In some embodiments, the display package includes a display package first part, a display package second part, a retaining member, and a male connector. The display package first part and the display package second part are connected to each other in a display state. The retaining member releasably retains a mobile device, wherein the retaining member is shaped to engage the mobile device so as to restrain the mobile device in at least one of up, down, right, left and forward directions. The male connector is adapted to connect the display package to a female receptacle in a vehicle interior.

In some embodiments, the display package includes a display package first part, a display package second part, a retaining member, a first holding member part, and a second holding member part. The display package first part and the display package second part are connected to each other in a display state. The retaining member releasably retains a mobile device, wherein the retaining member is shaped to engage the mobile device so as to restrain the mobile device in at least one of up, down, right, left, and forward directions. The first holding member part and the second holding member part form an adapter configured to hold the display package in a cup holder in a vehicle interior.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3A illustrates another view of the first exemplary display package convertible to a mobile device holder in a holder state according to some embodiments of the disclosure.

FIG. 3B illustrates yet another view of the first exemplary display package convertible to a mobile device holder in a holder state according to some embodiments of the disclosure.

FIG. 5C illustrates another view of the second exemplary display package convertible to a mobile device holder in a holder state according to some embodiments of the disclosure.

FIG. 6A illustrates a back view of the second exemplary display package convertible to a mobile device holder in a holder state according to some embodiments of the disclosure.

FIG. 6B illustrates a ball-style joint connection according to some embodiments of the disclosure.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Accordingly, a mobile device display package that is convertible to a mobile device holder is provided. By converting into a mobile device holder, the display package that displayed the mobile device for retail sale reduces the need of the mobile device user to purchase a separate mobile device holder. The display package may include a display package first part and a display package second part that, after opening to remove the mobile device, may be connected to each other and foldable onto each other. A portion of the display package may be transparent to permit potential customers to view the mobile device when the display package is in the flipped-closed state. The display package includes an integral retaining member to engage the mobile device so as to restrain the mobile device from moving in unwanted directions. In the flipped-open state, the display package may serve as a mobile device holder that leaves the control and display functions of the mobile device visible and accessible. The display package may be made from a single blank of transparent and flexible material, such as plastic, which offers potential customers a free mobile device holder. The display package may include an integral connecting member that connects the display package to parts of a vehicle interior, such as the dashboard, air vents, visors, or windows. The display package may also include an integral hanging member for displaying the display package with the mobile device therein.

The display package may include an integral male connector that can be used to connect the display package to a female receptacle, such as a cigarette lighter socket. The male connector may be coupled to the display package by a ball-style joint connector that enables the mobile device user to adjust the orientation of the display package in a vehicle interior. The male connector may also serve as a portion of a charger for the mobile device by drawing electrical power from the cigarette lighter socket. Furthermore, the display package may include an integral first holding member part and an integral second holding member part that form an adapter configured to hold the display package in a cup holder in a vehicle interior.

Figures 1, 2:
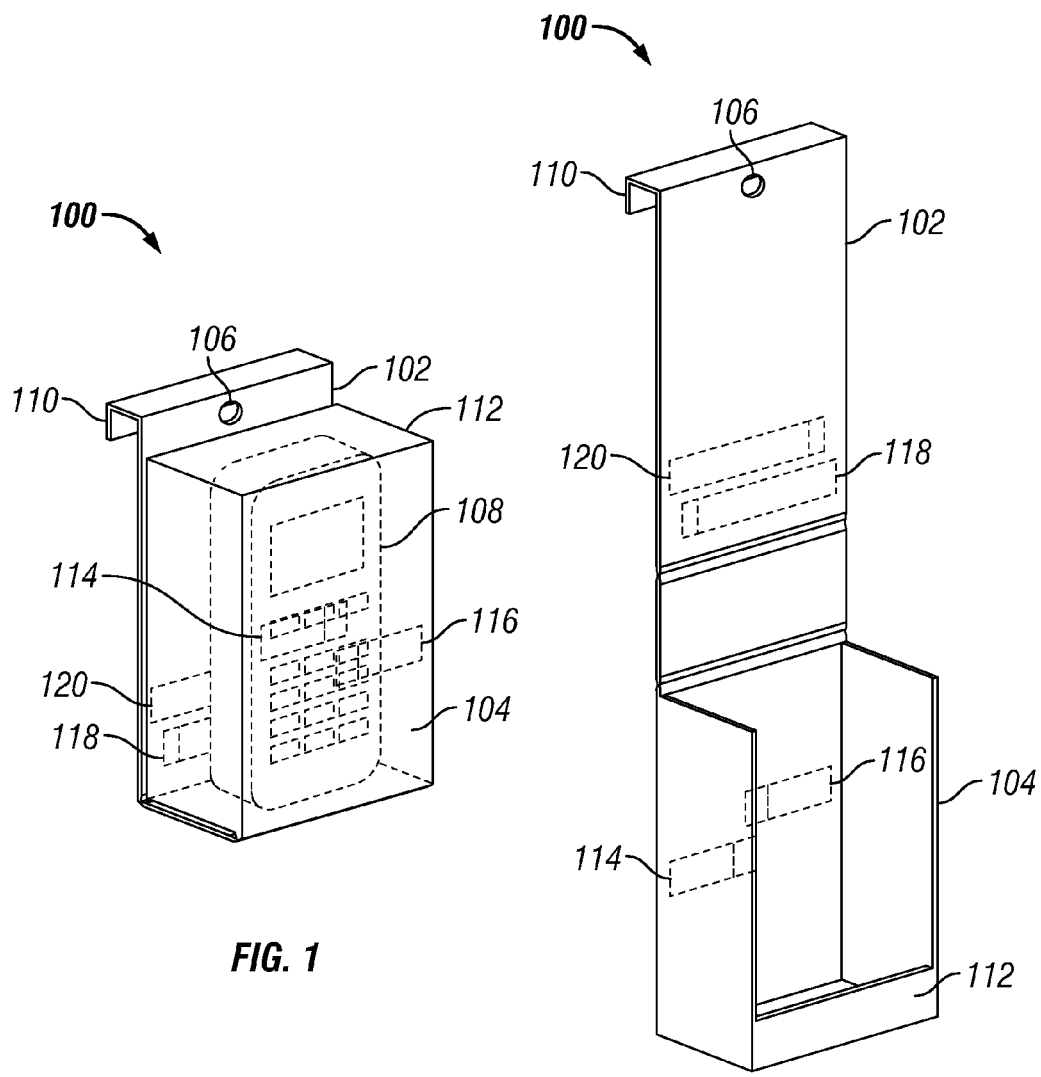
FIG. 1 illustrates a view of a first exemplary display package convertible to a mobile device holder in a display state according to some embodiments of the disclosure.
FIG. 2 illustrates a view of the first exemplary display package convertible to a mobile device holder in a holder state according to some embodiments of the disclosure.

FIG. 1 illustrates a view of an exemplary display package 100 that is convertible to a mobile device holder. In FIG. 1, the display package 100 is illustrated in a display state according to some embodiments of the disclosure. The display package 100 is adapted in the display state or mode for securely holding and displaying a mobile device 108 for sale. The mobile device 108 may be a personal digital assistant, a mobile phone, or other mobile device, for example. The display package 100 includes a display package second part 102, a display package first part 104, and a hanging member 106. Although depicted as a bar mobile phone, the mobile device 108 may take various forms including a clam-shell mobile phone, a wireless device, a media player, a pager, a personal digital assistant (PDA), or a very small form factor portable computer. Many suitable devices combine some or all of these functions. The device 108 may support specialized activities such as gaming, inventory control, job control, and/or task management functions, and so on. The hanging member 106 may be used for displaying the mobile device 108, which may be a prepaid mobile phone or other mobile device displayed at a point of sale location on a display rack, where the display package 100 is part of the display. In FIG. 1, the hanging member 106 is depicted as having an aperture formed in the display package second part 102 adapted to allow the display package 100 to be hung from a display apparatus for display, but the hanging member 106 may be a J-hook or other alternatives appropriate for hanging the display package 100.

A portion of the display package 100 may be transparent, thereby permitting potential customers to view the mobile device 108. Each of the display package first part 104 and the display package second part 102 may be made from a transparent and flexible material, such as plastic or other polymeric materials.

The display package 100 is illustrated as enclosing the mobile device 108. The display package first part 104 and the display package second part 102 are connected or coupled to each other and are foldable onto each other between a flipped-closed display state, as depicted by FIG. 1, and a flipped-open holder state. The display package 100 also includes a connecting member 110 that is coupled to or integral with the display package 100, and may be used to hang the display package 100 for potential customers to view. Additional information on the connecting member 110 is provided below.

The display package 100 may include a snap-fit closure assembly for holding the display package first part 104 closed against the display package second part 102. The snap-fit closure assembly may include a female receptacle formed in at least one of the display package first part 104 and the display package second part 102. The snap-fit closure assembly may also include a male connector formed in at least one of the display package second part 102 and the display package first part 104. The male connector may be adapted for interference fit with the female receptacle.

The display package 100 also includes a first retaining member 112, a second retaining member 114, a third retaining member 116, a fourth retaining member 118, and a fifth retaining member 120 to hold the mobile device 108.

FIG. 2 illustrates a view of the exemplary display package 100 convertible to a mobile device holder in a display state according to some embodiments of the disclosure. The display package first part 104 and the display package second part 102 are connected to each other and are foldable onto each other between a flipped-closed display state and a flipped-open holder state, as depicted by FIG. 2, which converts the display package 100 to a mobile device holder. The display package 100 may be formed from a single blank, such as when the display package first part 104 and the display package second part 102 are parts of one piece of transparent plastic.

FIG. 3A illustrates a view of the exemplary display package 100 convertible to a mobile device holder in a holder state according to some embodiments of the disclosure. The five retaining members 112-120 are depicted for the purposes of illustrative examples, as the display package 100 may include any number of retaining members 112-120 for releasably retaining the mobile device 108. The retaining members 112-120 are coupled to or integral with the display package 100. The retaining members 112-120 may protrude to serve a similar function when the display package 100 is used for displaying the mobile device 108 to potential customers, or the retaining members 112-120 may be part of the display package 100 that pops or snaps out from a flush surface to function as the retaining members 112-120 in the mobile device holder state. One or more of the retaining members 112-120 may be shaped to engage a particular related part of the mobile device 108, so as to restrain the mobile device 108 in at least one of the up, down, right, left, and forward directions. For example, the first retaining member 112 restrains the mobile device 108 in the down and forward directions, the second retaining member 114 restrains the mobile device 108 in the left and forward directions, and the third retaining member 116 restrains the mobile device 108 in the right and forward directions.

FIG. 3B illustrates a view of the exemplary display package 100 convertible to a mobile device holder in another holder state according to some embodiments of the disclosure. In FIG. 3B, the mobile device 108 is depicted as a clam shell mobile phone. For this example, the first retaining member 112 restrains the mobile device 108 in the down and forward directions, the second retaining member 114 restrains the mobile device 108 in the left and forward directions, the third retaining member 116 restrains the mobile device 108 in the right and forward directions, the fourth retaining member 118 restrains the mobile device 108 in the right and forward directions, and the fifth retaining member 116 restrains the mobile device 108 in the left and forward directions.

Figures 4A, 4B, 4C:
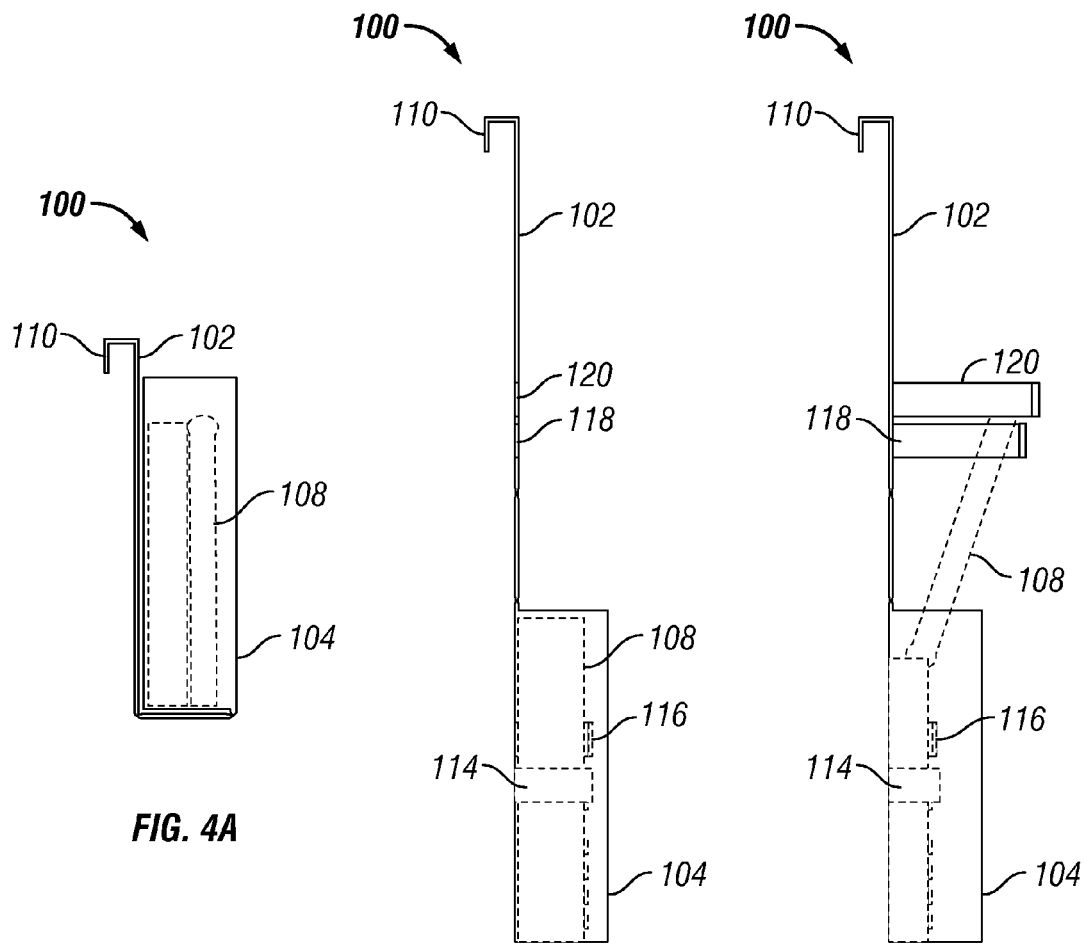
FIG. 4A illustrates a side view of the first exemplary display package convertible to a mobile device holder in a display state according to some embodiments of the disclosure.
FIG. 4B illustrates a side view of the first exemplary display package convertible to a mobile device holder in a holder state according to some embodiments of the disclosure.
FIG. 4C illustrates another side view of the first exemplary display package convertible to a mobile device holder in a holder state according to some embodiments of the disclosure.

FIG. 4A illustrates a side view of the exemplary display package 100 convertible to a mobile device holder in a display state according to some embodiments of the disclosure. The connecting member 110 may connect the display package 100 to a retail display for displaying the display package 100 with the mobile device 108 therein.

FIG. 4A illustrates a side view of the exemplary display package 100 convertible to a mobile device holder in a holder state according to some embodiments of the disclosure. The connecting member 110 may connect the display package 100 to a vehicle interior, and the flexible nature of the display package 100 enables a mobile device user to bend the display package 100 to conform to the vehicle's interior. The connecting member 110 may have a hook having a substantially J-shape that is used to connect the display package 100 to an air vent, a rearview mirror, a visor, a steering wheel, a window ledge, or a window top, or other feature of the vehicle's interior. Although shown as a J-shaped hook in FIGS. 1-4C, the connecting member 110 may be other types of connectors. For example, the connecting member 110 may have an eye formed as an aperture having a substantially circular shape that is used to connect the display package 100 to the end of a visor. The connecting member 110 may have a securing tie that is used to connect the display package 100 to a rearview mirror, a steering wheel, or a visor. The connecting member 110 may have a suction device that is used to connect the display package 100 to a dashboard, a door, a rearview mirror, a visor, or a window. The connecting member 110 may have a temporary locking fastener that is used to connect the display package 100 to a rearview mirror, a steering wheel, or a visor. The connecting member 110 may have a double-sided tape that is used to connect the display package 100 to a dashboard, a door, a rearview mirror, a steering wheel, a visor, or a window. The connecting member 110 may have an adjustable belt that is used to connect the display package 100 to an air vent, a rearview mirror, a steering wheel, or a visor.

The connecting member 110 may include a first panel of hook and loop fabric material and a second panel of hook and loop fabric material for affixing to the vehicle interior, wherein the first panel and the second panel comprise mutually mating components for selectively attaching to one another on contact and removing from one another. For example, a mobile device user may peel a covering off an adhesive backing for the second panel of hook and loop fabric material, and affix the second panel to a dashboard of a vehicle. The first panel of the hook and fabric material may be part of or adhered to the connecting member 110, which enables the mobile device user to repeatedly attach the display package 100 to the dashboard via the panels of hook and fabric material and repeatedly detach the display package 100 from the dashboard. The connecting member 110 may include one or more of these connectors or other connectors well known in the art.

In FIG. 4B, the mobile device 108 is depicted as a bar mobile phone. As such, the display package 100 uses the first retaining member 112, the second retaining member 114, and the third retaining member 116 to restrain the mobile device 108 in at least one of the up, down, right, left, and forward directions. In one example, the connecting member 110 may have a hook having a substantially J-shape that is used to connect the display package 100 to a defroster vent by using the length of the display package second part 102 to reach across the dashboard.

FIG. 4C illustrates a side view of the exemplary display package 100 convertible to a mobile device holder in the other holder state according to some embodiments of the disclosure. In FIG. 4C, the mobile device 108 is depicted as a clam shell mobile phone. As such, the display package 100 uses the first retaining member 112, the second retaining member 114, the third retaining member 116, the fourth retaining member 118, and the fifth retaining member 120 to restrain the mobile device 108 in at least one of the up, down, right, left, and forward directions. The display package 100 may support the mobile device 108 in a manner leaving the control and display functions of the mobile device 108 visible and accessible. For example, the display package 100 is attached to the dashboard of a vehicle in a manner that leaves the control and display functions of a bar mobile phone visible and accessible for making and receiving calls, or for accessing, viewing, and listening to a navigation application that provides driving directions.

Figures 5A, 5B:
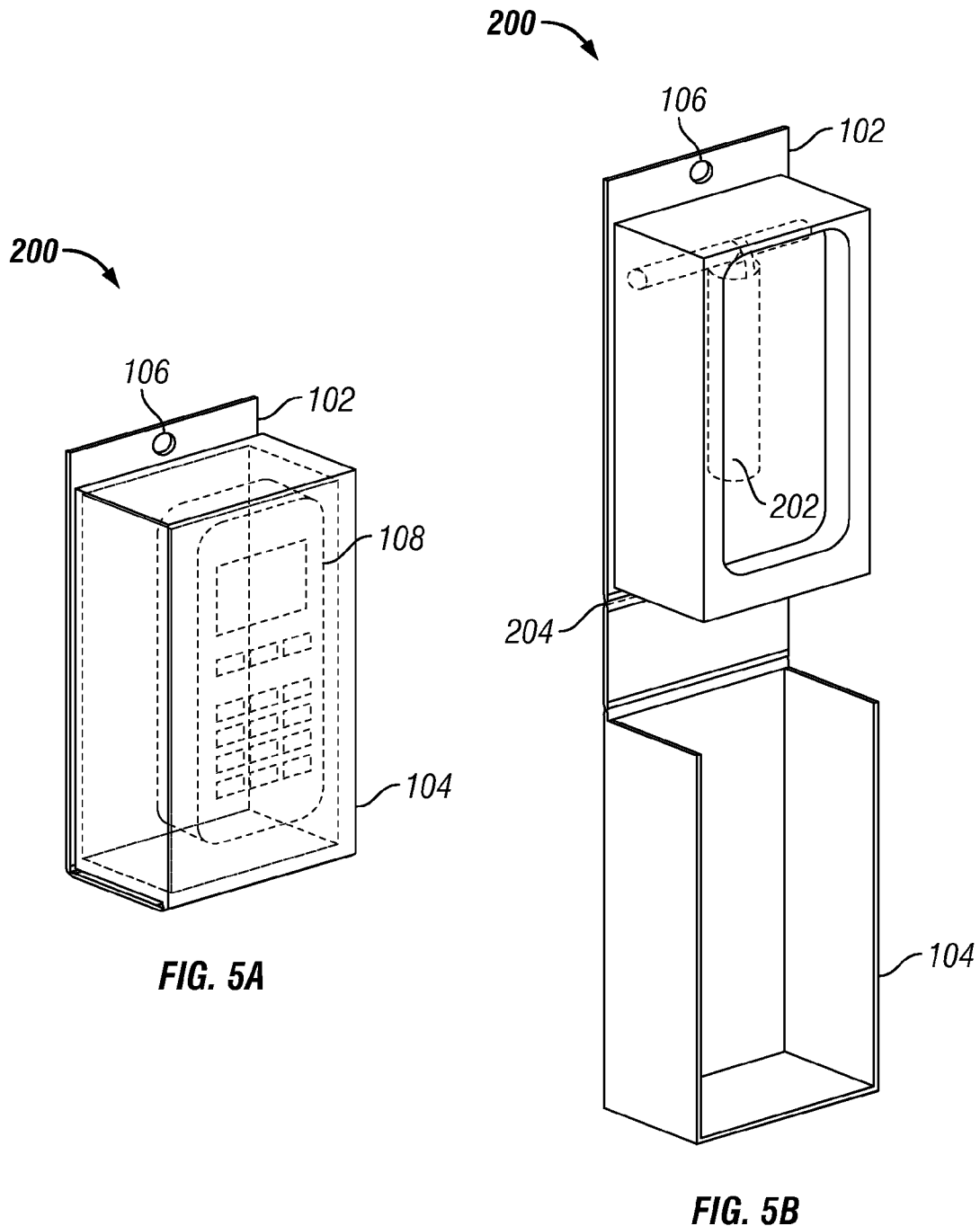
FIG. 5A illustrates a view of a second exemplary display package convertible to a mobile device holder in a display state according to some embodiments of the disclosure.
FIG. 5B illustrates a view of the second exemplary display package convertible to a mobile device holder in a display state according to some embodiments of the disclosure.

FIG. 5A illustrates a view of an exemplary display package 200 convertible to a mobile device holder in a display state according to some embodiments of the disclosure. The display package 200 includes the display package second part 102, the display package first part 104, and the hanging member 106.

FIG. 5B illustrates a view of the exemplary display package 200 convertible to a mobile device holder in a holder state according to some embodiments of the disclosure. The display package 200 includes a male connector 202. The male connector 202 is coupled to or integral with the display package 200. FIG. 2B depicts the display package 200 in the holder state, with the display package first part 104 no longer covering the mobile device 108 and the male connector 202 not yet connecting the display package 200 to a female receptacle in a vehicle interior. The display package 200 also includes a tear line 204, at which the mobile device user may detach the display package first part 104 from the display package second part 102.

FIG. 5C illustrates a second view of the exemplary display package 200 convertible to a mobile device holder in the holder state according to some embodiments of the disclosure. FIG. 5C depicts the display package 200 in the mobile device holder state, with the display package first part 104 no longer covering the mobile device 108 nor attached to the display package second part 102, and the male connector 202 not yet adapted for connecting the display package 100 to a female receptacle in a vehicle interior.

FIG. 6A illustrates a back view of the exemplary display package 200 convertible to a mobile device holder in the holder state according to some embodiments of the disclosure The male connector 202 may be configured to connect the display package 200 to a female receptacle in a vehicle interior, such as the cigarette lighter socket. For example, the male connector 202 connects to a cigarette lighter socket in a vehicle interior to hold the display package 200 that holds the mobile device 108 in a manner that leaves the control and display functions visible and accessible. The male connector 202 may be coupled to the display package 200 by a rotating rod, a ball-style joint connector (as illustrated in FIG. 6B), or other well-known assembly that promotes adjustment of an orientation for the display package 200. For example, the mobile device user adjusts the male connector 202 to orient the display package 200 to view the display screen of the mobile device 108.

Figure 7A:
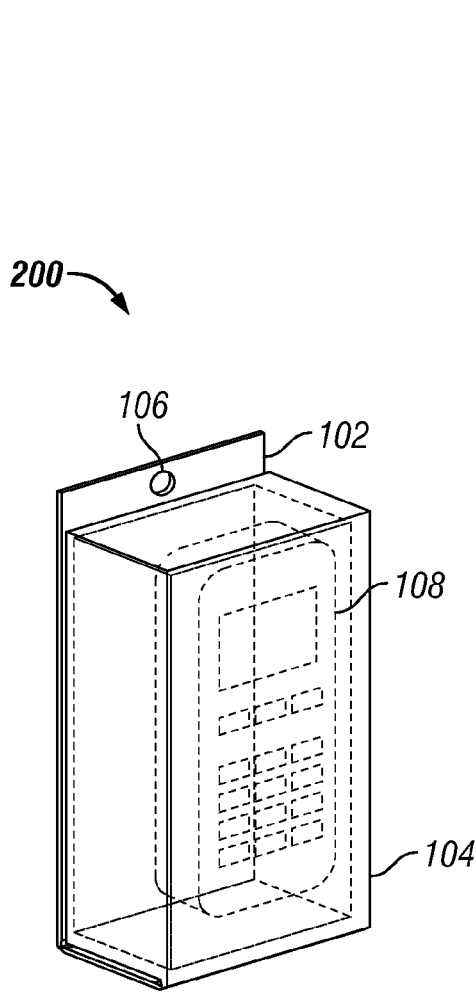
FIG. 7A illustrates another view of the second exemplary display package convertible to a mobile device holder in a display state according to some embodiments of the disclosure.

FIG. 7A illustrates a second view of the exemplary display package 200 convertible to a mobile device holder in a display state according to some embodiments of the disclosure. The display package 200 includes the display package second part 102, the display package first part 104, and the hanging member 106.

Figure 7B:
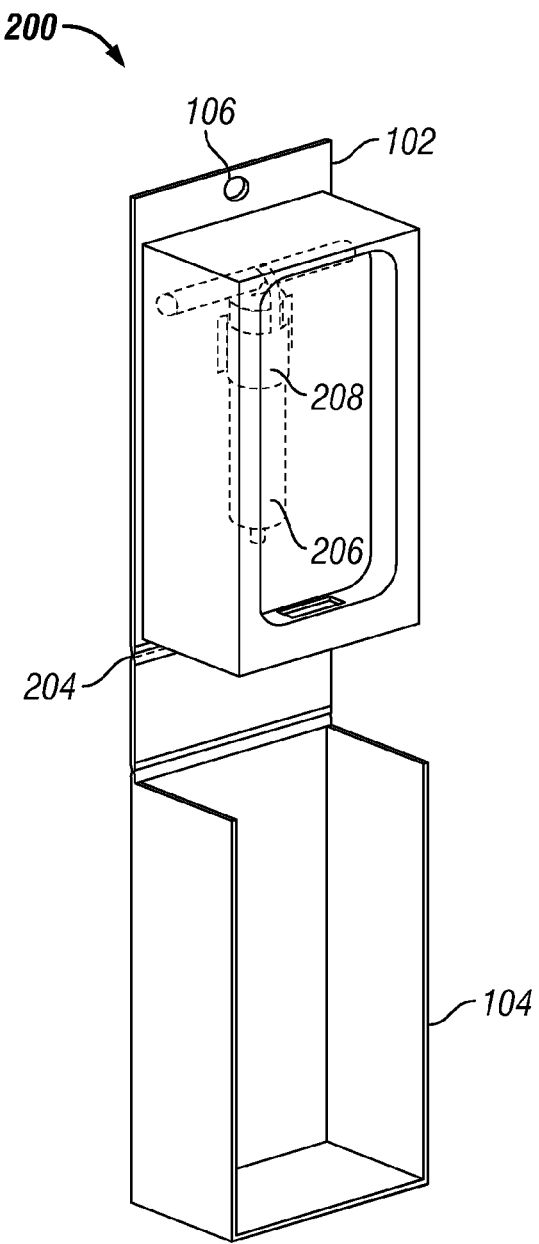
FIG. 7B illustrates yet another view of the second exemplary display package convertible to a mobile device holder in a holder state according to some embodiments of the disclosure.

FIG. 7B illustrates a third view of the exemplary display package 200 convertible to a mobile device holder in a holder state according to some embodiments of the disclosure. The display package 200 includes a tear line 204, at which the mobile device user may detach the display package first part 104 from the display package second part 102, a portion 206 of a charger for the mobile device 108, and a male connector 208. The male connector 208 is coupled to or integral with the display package 200. FIG. 7B depicts the display package 200 in the holder state, with the display package first part 104 no longer covering the mobile device 108 and the portion 206 of the charger not yet connecting the display package 200 to an electrical outlet, such as the cigarette lighter socket, in a vehicle interior.

Figure 7C:
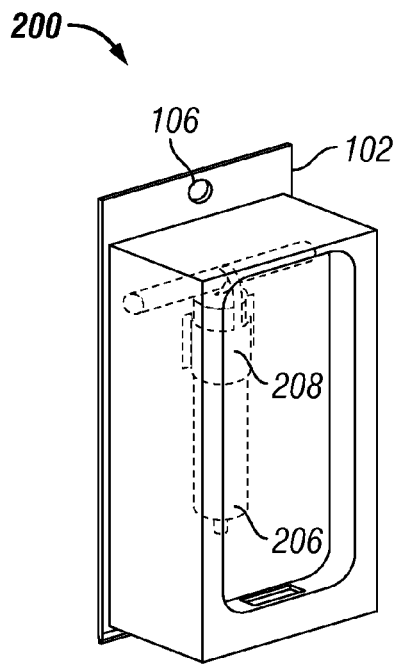
FIG. 7C illustrates an additional view of the second exemplary display package convertible to a mobile device holder in a holder state according to some embodiments of the disclosure.

FIG. 7C illustrates a fourth view of the exemplary display package 200 convertible to a mobile device holder in the holder state according to some embodiments of the disclosure. FIG. 7C depicts the display package 200 in the mobile device holder state, with the display package first part 104 no longer covering the mobile device 108 nor attached to the display package second part 102, and the male connector 208 and the portion 206 of the charger not yet adapted for connecting the display package 200 to the electrical outlet in a vehicle interior.

Figure 8:
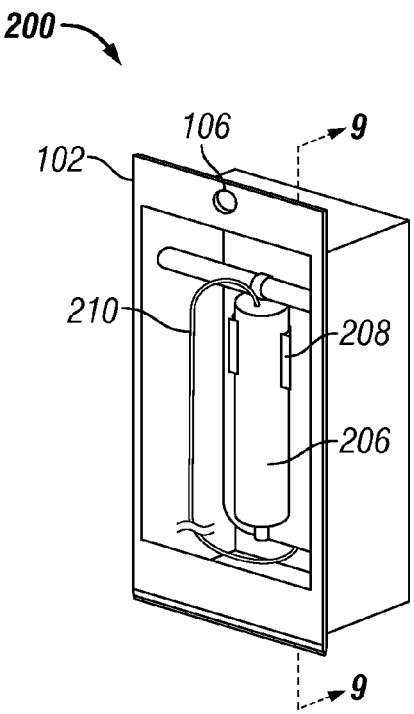
FIG. 8 illustrates another back view of the second exemplary display package convertible to a mobile device holder in a holder state according to some embodiments of the disclosure.

FIG. 8 illustrates a second back view of the exemplary display package 200 convertible to a mobile device holder in the holder state according to some embodiments of the disclosure The male connector 208 may be configured to connect the display package 200 to any electrical outlet in a vehicle interior, such as the cigarette lighter socket. For example, the male connector 208 connects the portion 206 of the charger to a cigarette lighter socket in a vehicle interior to hold the display package 200 that holds the mobile device 108 in a manner that leaves the control and display functions visible and accessible. The male connector 208 may be coupled to the display package 200 by a rotating rod, a ball-style joint connector, or other well-known assembly that promotes adjustment of an orientation for the display package 200. For example, the mobile device user adjusts the male connector 208 to orient the display package 200 to view the display screen of the mobile device 108. The electrical connection 210 connects the mobile device 108 to the portion 206 of the charger, which receives electrical power from a cigarette lighter socket.

Figure 9:
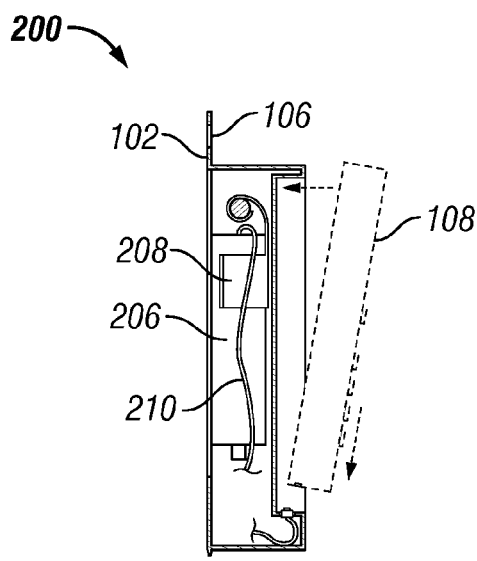
FIG. 9 illustrates a cross sectional view of the second exemplary display package convertible to a mobile device holder in a holder state according to some embodiments of the disclosure.

FIG. 9 illustrates a cross sectional view of the exemplary display package 200 convertible to a mobile device holder in the holder state according to some embodiments of the disclosure. FIG. 9 depicts the display package 200 in the mobile device holder state, with the male connector 208 and the portion 206 of the charger not yet adapted for connecting the display package 100 to the electrical outlet in a vehicle interior. FIG. 9 also depicts the hanging member 106 and the electrical connection 210.

Figure 10:
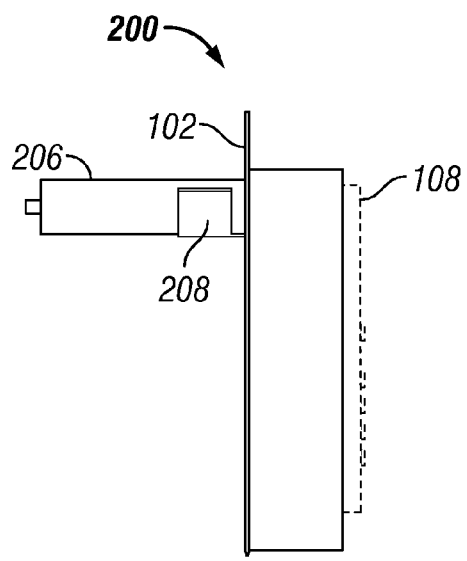
FIG. 10 illustrates another side view of the second exemplary display package convertible to a mobile device holder in a holder state according to some embodiments of the disclosure.

FIG. 10 illustrates a side view of the exemplary display package 200 convertible to a mobile device holder in the holder state according to some embodiments of the disclosure The male connector 208 may be configured to connect the display package 200 to any electrical outlet in a vehicle interior, such as the cigarette lighter socket. For example, the male connector 208 connects the portion 206 of the charger to a cigarette lighter socket in a vehicle interior to hold the display package 200 that holds the mobile device 108 in a manner that leaves the control and display functions visible and accessible. The mobile device user may adjust the male connector 208 to orient the display package 200 to view the display screen of the mobile device 108.

Figure 11:
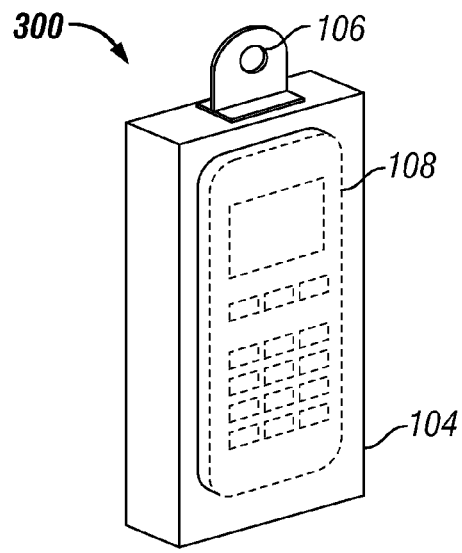
FIG. 11 illustrates a view of a third exemplary display package convertible to a mobile device holder in a display state according to some embodiments of the disclosure.

FIG. 11 illustrates a view of an exemplary display package 300 convertible to a mobile device holder in a display state according to some embodiments of the disclosure. FIG. 11 depicts that the display package 300 includes the display package first part 104 and the hanging member 106.

Figure 12:
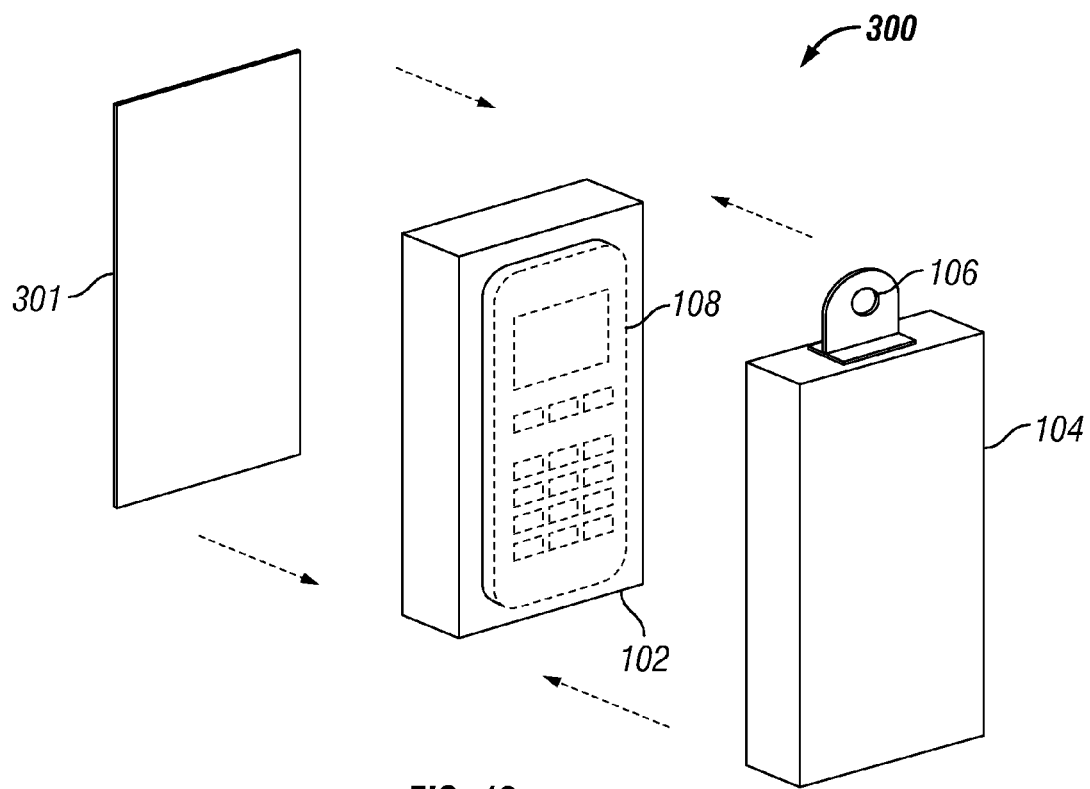
FIG. 12 illustrates another view of the third exemplary display package convertible to a mobile device holder in a display state according to some embodiments of the disclosure.

FIG. 12 illustrates a second view of the exemplary display package 300 convertible to a mobile device holder in a display state according to some embodiments of the disclosure. The display package 300 includes the display package second part 102, the display package first part 104, the hanging member 106, and a back cover 301. In FIG. 12, the display package first part 104 and the back cover 301 have been removed from the display package second part 102 of the display package 300. The back cover 301 may protect holding members when the display package 300 is in the display state.

Figure 13:
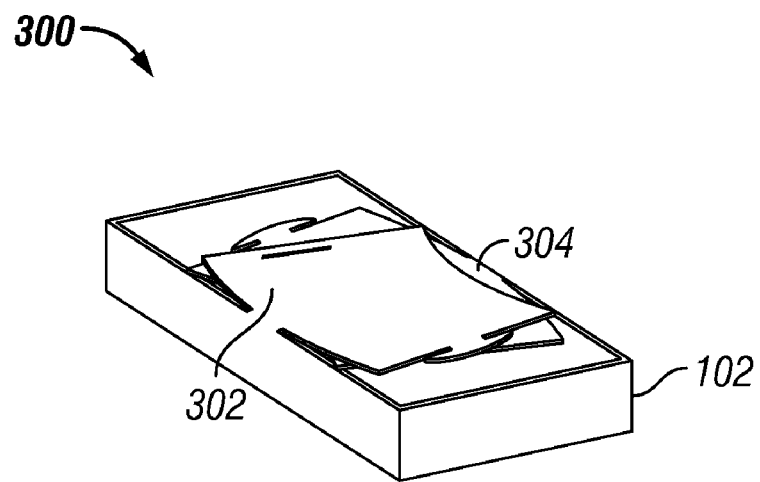
FIG. 13 illustrates a back view of the third exemplary display package convertible to a mobile device holder in a display state according to some embodiments of the disclosure.

FIG. 13 illustrates a back view of the exemplary display package 300 convertible to a mobile device holder in an unfolded state according to some embodiments of the disclosure. The display package 300 includes the display package second part 102, a first holding member part 302 and a second holding member part 304. The first holding member part 302 and the second holding member part 304 may be folded behind the display package second part 102 and covered by the back cover when the display package 300 is in the display state.

Figure 14:
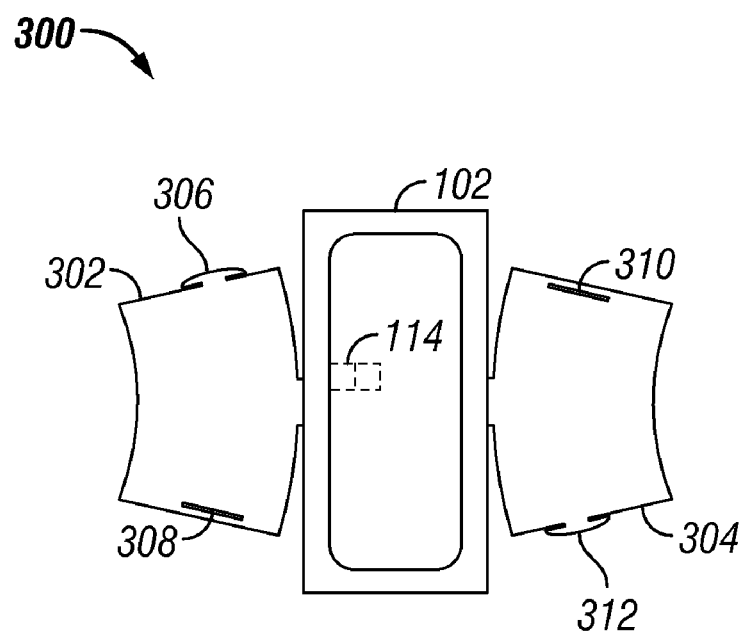
FIG. 14 illustrates another back view of the third exemplary display package convertible to a mobile device holder in a display state according to some embodiments of the disclosure.

FIG. 14 illustrates a second back view of the exemplary display package 300 convertible to a mobile device holder in an unfolded state according to some embodiments of the disclosure. The display package 300 includes the display package second part 102, the first holding member part 302, the second holding member part 304, a first connecting tab 306, a first connecting receptacle 308, a second connecting receptacle 310, a second connecting tab 312, and the second retaining member 114.

Figure 15:
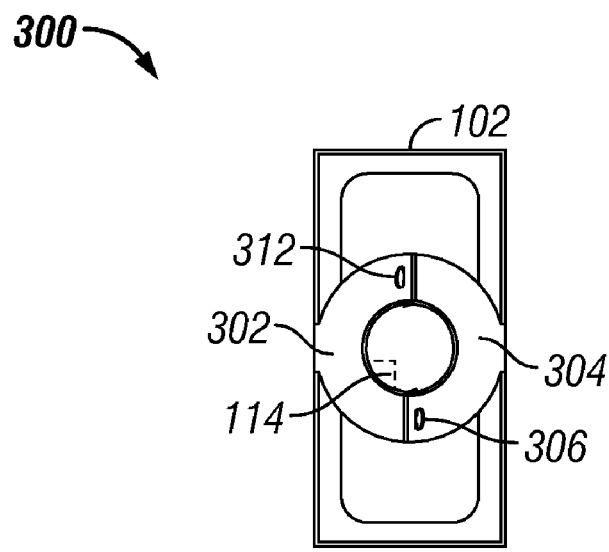
FIG. 15 illustrates a bottom view of the third exemplary display package convertible to a mobile device holder in a holder state according to some embodiments of the disclosure.

FIG. 15 illustrates a bottom view of the exemplary display package 300 convertible to a mobile device holder in the holder state according to some embodiments of the disclosure. The display package 300 includes the display package second part 102, the first holding member part 302, the second holding member part 304, and the second retaining member 114 to hold the mobile device 108. The first holding member part 302 and the second holding member part 304 form an adapter configured to hold the display package 300 in a cup holder in a vehicle interior, wherein the first and second holding member parts 302 and 304 are coupled to or integral with the display package 300.

The first holding member part 302 and the second holding member part 304 each include at least one connecting tab for connecting each of the holding member parts to the other of the holding member parts. For example, the first connecting tab 306 on the first holding member part 302 connects to the second connecting receptacle 310 of the second holding member part 304 and the second connecting tab 312 on the second holding member part 304 connects to the first connecting receptacle 308 of the first holding member part 302.

Figure 16:
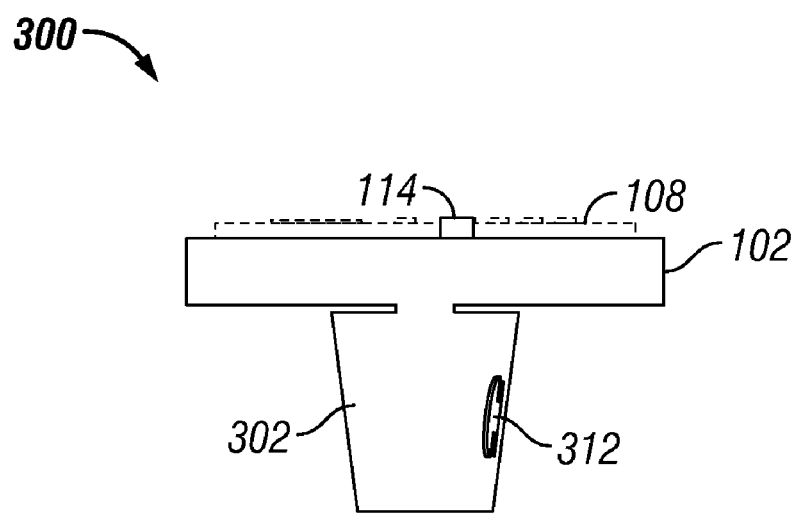
FIG. 16 illustrates a side view of the third exemplary display package convertible to a mobile device holder in a holder state according to some embodiments of the disclosure.

FIG. 16 illustrates a side view of the exemplary display package 300 convertible to a mobile device holder in the holder state according to some embodiments of the disclosure. The adapter formed by the first holding member part 302 and the second holding member part 304 may be tapered and may include at least one circumferential ridge dimensioned to contact an existing cup holder to assist in securing the display package 300 in position in the cup holder. A circumferential ridge may be a raised ridge that encircles the adapter and helps secure the adapter against the inner sleeve of the cup holder. The second retaining member 114 holds the mobile device 108 within the display package 300.

Figure 17A:
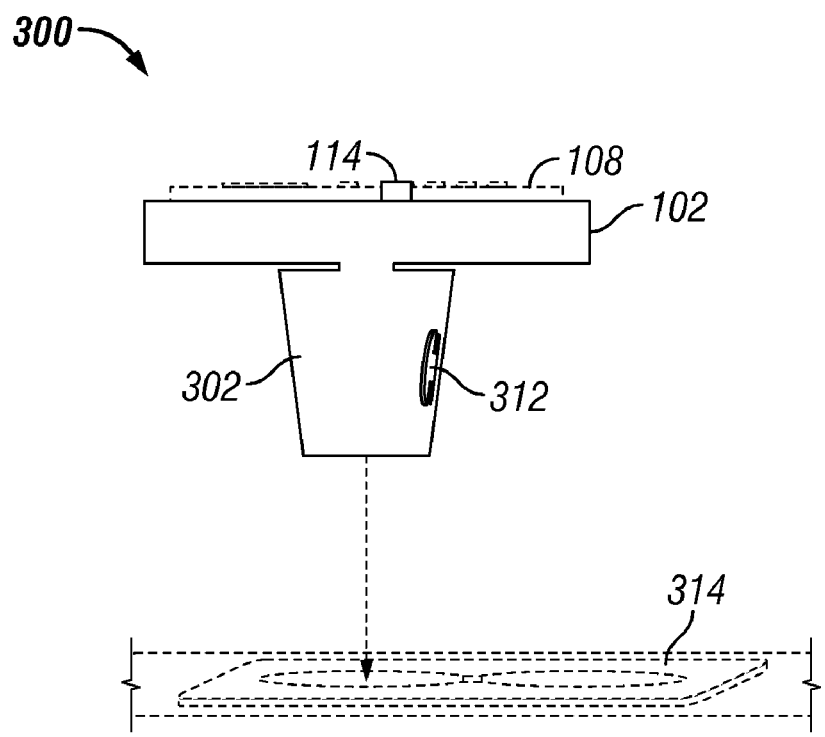
FIG. 17A illustrates another side view of the third exemplary display package convertible to a mobile device holder in a holder state according to some embodiments of the disclosure.

FIG. 17A illustrates a second side view of the exemplary display package 300 convertible to a mobile device holder in the holder state according to some embodiments of the disclosure. The adapter formed by the first holding member part 302 and the second holding member part 304 may be tapered to contact an existing cup holder 314 to assist in securing the display package 300 in position in the existing cup holder 314. The second retaining member 114 holds the mobile device 108 within the display package 300 when the display package 300 is being secured in position in the existing cup holder 314.

Figure 17B:
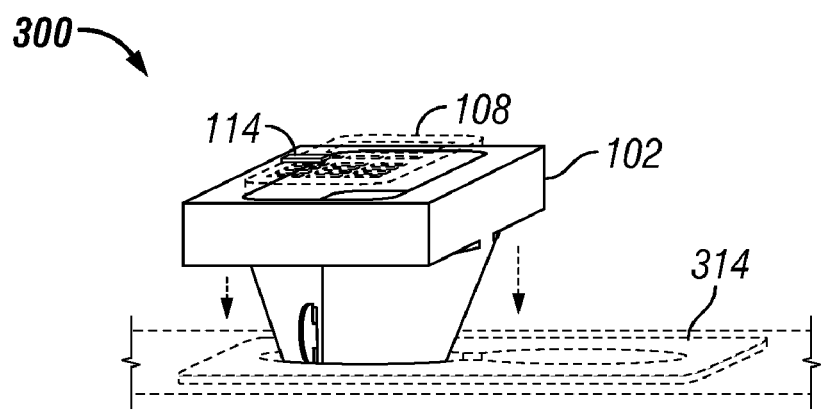
FIG. 17B illustrates yet another side view of the third exemplary display package convertible to a mobile device holder in a display state according to some embodiments of the disclosure.

FIG. 17B illustrates yet a third side view of the exemplary display package 300 convertible to a mobile device holder in the holder state according to some embodiments of the disclosure. The adapter formed by the first holding member part 302 and the second holding member part 304 may assist in securing the display package 300 in position in the existing cup holder 314. The second retaining member 114 may be a tab or a mobile device storage pocket, such as a clear plastic pocket that holds the mobile device 108 in a manner that leaves the control and display functions visible and accessible.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A display package that is convertible to a mobile device holder, comprising:
    a display package comprising a first part and a second part connected to each other, wherein the first part is adapted to engage the second part to enclose a mobile device in a display state, wherein the first part is adapted to expose the mobile device in a holder state, wherein the second part comprises a retaining member adapted to releasably retain the mobile device, wherein the retaining member is shaped to engage the mobile device so as to restrain the mobile device in at least one of up, down, right, left, or forward direction; and
    a male connector coupled to the display package, wherein the male connector is adapted to connect the display package to a female receptacle in a vehicle interior in the holder state, wherein the male connector is adapted to store within the second part in the display state, and wherein the male connector is adapted to rotate out from the second part from the display state to the holder state.

2. The display package of claim 1, wherein the male connector is adapted to connect the display package to a cigarette lighter socket.

3. The display package of claim 1, wherein the male connector is a portion of a charger for the mobile device.

4. The display package of claim 1, wherein the male connector is coupled to the display package by a ball-style joint connector that promotes adjustment of an orientation for the display package.

5. The display package of claim 1, wherein the male connector is coupled to the display package by a rotating rod connector.

6. The display package of claim 1, wherein the male connector is coupled to the second part.

7. The display package of claim 1, wherein the first part and the second part are releasably connected.

8. The display package of claim 1, wherein the display package further comprises a tear line between the first part and the second part.

9. The display package of claim 1, wherein the display package further comprises an electrical connection coupled to the male connector and adapted to couple to the mobile device.

10. The display package of claim 1, wherein the female receptacle is an electrical outlet.

11. The display package of claim 1, wherein the retaining member is further adapted to releasably retain the mobile device in an orientation that leaves the control and display functions visible and accessible.

12. The display package of claim 1, wherein the first part and the second part are foldably connected.

13. The display package of claim 12, wherein the first part is adapted to fold onto the second part in the display state.

14. The display package of claim 13, wherein the first part and the second part are formed from a single blank.

15. The display package of claim 1, wherein the display package further comprises a hanging member.

16. The display package of claim 15, wherein the hanging member comprises an aperture adapted to engage a display apparatus.

17. The display package of claim 15, wherein the hanging member comprises a J-hook adapted to engage a display apparatus.

* * * * *